United States Patent Office 3,677,824
Patented July 18, 1972

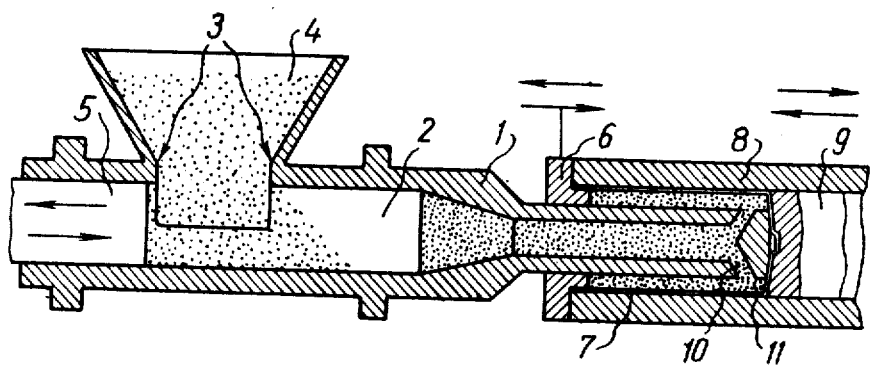

3,677,824
ARRANGEMENT FOR MANUFACTURE OF A PRIMARY CELL ELECTRODE
Faat Khatovich Nabiullin, 3 Mytischinskaya ul. 14–a, kv. 90; Zoya Mikhailovna Buzova, Suschevsky val. 23, kv. 116; Efim Mikhailovich Gertsik, 3 Mytischinskaya ul. 14–a, kv. 98; and Sergei Alexeevich Zjuzin, Vseslavinskaya ul. 8, kv. 76, all of Moscow, U.S.S.R.
Continuation of abandoned application Ser. No. 806,476, Mar. 12, 1969. This application Mar. 1, 1971, Ser. No. 119,935
Int. Cl. H01m 21/06
U.S. Cl. 136—175
5 Claims

ABSTRACT OF THE DISCLOSURE

A device for the manufacture of a primary cell electrode wherein a primary cell casing its placed in a female die whose bottom is constituted by an ejector, and said casing in conjunction with a retaining washer, which defines the position and shape of the top end of the electrodes, and a stem having a central duct and introduced into said primary cell casing, form a closed tubular chamber, provision being made in the portion of said stem within said tubular chamber for channels, which channels originate in the central duct of said stem, pass through the walls of said stem, and terminate in said tubular chamber.

---

This application is a continuation of application Ser. No. 806,476, filed Mar. 12, 1969 which is now abandoned.

The present invention relates to devices for the manufacture of primary cell electrodes, preferably coaxially disposed tubular positive electrodes of cylindrical primary alkaline cells.

Widely known in the art is a device for the manufacture of tubular electrodes of primary alkaline cells, wherein use is made of a hollow tubular knife to remove a part of the electrode material.

The main disadvantage of the known device is necessity of the successive reprocessing of 50–60% of the electrode material, insofar as this amount of the electrode material is removed by the hollow knife. The electrode material undergoes marked compaction while being removed and should, therefore, be subjected to crushing, grading and additional humidification prior to recycling it back. It is to be noted that recycling repeatedly the electrode material affects adversely its quality due to the fact that the alkali contained in the electrode material undergoes carbonation by the atmospheric carbon dioxide. A further disadvantage of the known device is that it calls for multistage manufacturing process involving the following operation sequences: batching the requisite amount of the electrode material, pressing the electrode material into a cell casing and removing a part of the electrode materials from the casing by means of a hollow knife. The electrodes manufactured by means of the known device exhibit non-uniform quality and weight characteristics due to the fact that the manufacturing process involves several operation sequences and also suffer from the limitation of having density variations with the height caused by additional pressing of the electrode material during the cutting step.

The short service life of hollow knives, in combination with the aforementioned disadvantages inherent in the known device, provides a serious difficulty to the automatization of the process for manufacturing the tubular electrodes by means of the device in question.

Also known in the art is a device for manufacturing tubular electrodes which comprises a nozzle, whose annular cavity is intended for pressing out the electrode material directly into a primary cell casing, so that the process of tubular electrode manufacture does not involve a plurality of operation sequences and obviates electrode material losses.

This device, however, is also not devoid of serious limitations which affect adversely the stability of electrode quality. The device does not provide a reliable contact between the electrode material and the walls of a cell casing, and the top end face of the electrode formed by disengaging the molded electrode from the nozzle lacks adequate density and uniformity and tends to deteriorate, so that there might lead to short-circuiting between the electrodes in the course of carrying out subsequent steps of manufacturing the primary cell.

It is an object of the present invention to eliminate the disadvantages inherent in the known devices for the manufacture of tubular electrodes of primary alkaline cells and to provide a highly efficient and reliable device which will make it possible to attain superior quality characteristics of the electrodes and to minimize the number of operation sequences.

Said and another objects according to the present invention may be accomplished by providing an automatic device which will minimize the number of manufacturing process steps and will be noted for its high efficiency and dependable performance.

Accordingly, the present invention consists in device for the manufacture of a primary cell electrode comprising a female die, which accommodates a primary cell casing, an ejector, which constitutes the die bottom; a retaining washer, which defines the position and shape of the electrode end, and a hollow stem introduced into the casing of the primary cell being manufactured, wherein the aforesaid casing, retaining washer and hollow stem form a closed chamber and provision is made in the lower part of the stem accommodated in the aforesaid chamber for channels, which channels pass through the stem walls and connect the centrally disposed duct of the stem with a tubular space confined by the outer surface of the stem and the inner surface of the casing.

The present invention is illustrated hereinbelow by the description of an exemplary embodiment therof with reference to an accompanying drawing, which shows a sectional view of the device, according to the present invention.

The device for the manufacture of a primary cell electrode comprises stem 1 having central duct 2 and electrode material feed port 3.

Disposed in central duct 2 is male die 5, while on the stem portion that enters cell casing 7 and defines the size and shape of the electrode pocket provision is made for movable retaining washer 6, whose collar protrudes into cell casing 7 disposed in female die 8 and resting on ejector 9.

In the portion of stem 1 which enters cell casing 7, provision is made for channels 10.

The arrangement, according to the present invention, functions in the following manner.

After inserting cell casing 7 into female die 8, the latter is displaced leftwards, as shown in the drawing, whereupon the collar of retaining washer 6 and stem 1 enter cell casing 8 and form closed chamber 11.

When male die 5 is displaced leftwards, port 3 will be opened thereby providing for the flow of electrode material 4 into central duct 2 of stem 1.

The preliminary operation sequences having been completed, the rightward travel of male die 5 compresses electrode material 4 and direct the thus compacted material from central duct 2 via channels 10 into closed chamber 11, whereby the sought electrode is formed.

The die 8 and casing 7 is moved to the right by retaining washer 6 off stem 1, and ejector 9 expels the cell casing with the electrode contained therein from female die 8, and the device is ready for repeating the electrode manufacturing cycle.

We claim:

1. A device for the manufacture of a primary cell electrode comprising a stem having a duct and a port leading to said duct for introduction thereinto of electrode material, a female die adapted to accommodate a primary cell casing, said stem and die being relatively movable to permit insertion of said stem into said die and withdrawal therefrom, said die having an inner cavity which is larger in diameter than said stem to form an annular chamber therebetween when the stem is inserted into the die, said stem having channels therein for passage of material therefrom into said annular chamber, a displaceable ejector in said female die closing one end of said annular chamber, a retaining washer on said stem for engaging said female die to establish the position and shape of said electrode, said retaining washer including a portion extending into said die to close said annular chamber at the other end thereof, and a displaceable male die in said stem for compressing the electrode material in said annular chamber to unite the same with the primary cell casing and form said primary cell electrode.

2. A device as in claim 1 wherein said retaining washer is displaceable on said stem.

3. A device as in claim 1 wherein said male die is displaceable between a compression position in which said port is blocked by said male die and a supply position in which the male die is retracted to open the port and permit introduction of electrode material into said stem.

4. A device as claimed in claim 1 wherein said duct is axial in the stem and said channels are radial.

5. A device as claimed in claim 4 wherein said duct is centrally located in the stem.

References Cited

UNITED STATES PATENTS

| | | | |
|---|---|---|---|
| 3,156,749 | 11/1964 | Hosfield | 264—268 |
| 3,506,750 | 4/1970 | Nabiullin et al. | 136—175 |
| 3,556,861 | 1/1971 | Jammet | 136—175 |

DONALD L. WALTON, Primary Examiner

U.S. Cl. X.R.

29—204; 264—268